Figure 1:
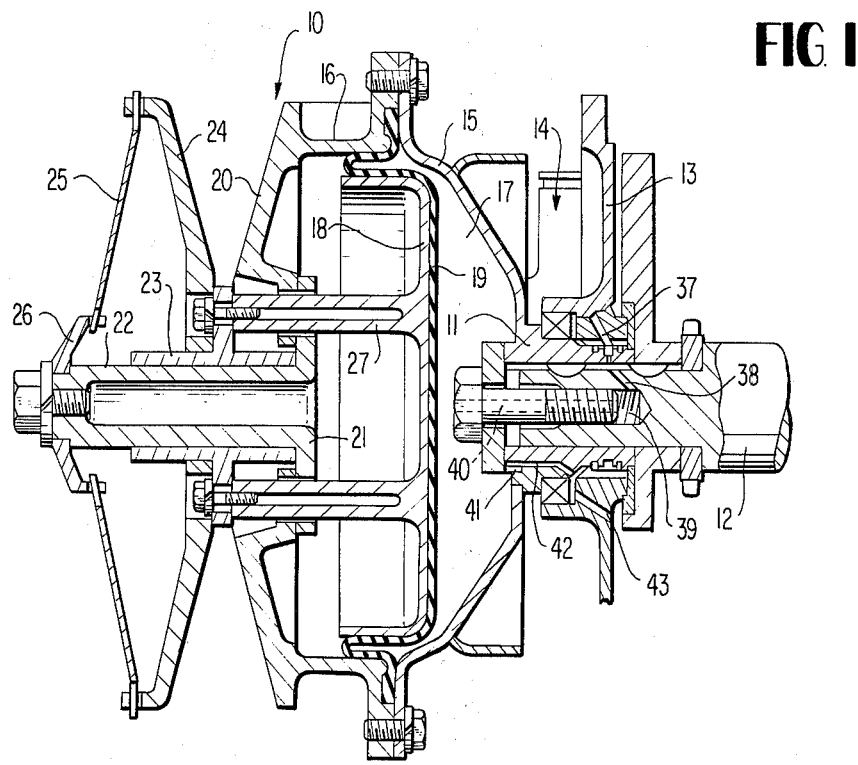

United States Patent [19]
Zaiser et al.

[11] 3,906,808
[45] Sept. 23, 1975

[54] CONTROLLABLE AGGREGATE-DRIVE FOR INTERNAL COMBUSTION ENGINES, ESPECIALLY FOR MOTOR VEHICLE INTERNAL COMBUSTION ENGINES

[75] Inventors: Wolfgang Zaiser, Althutte; Sigurd Hainmuller, Aichschiess, both of Germany

[73] Assignee: Daimler-Benz Aktiengesellschaft, Germany

[22] Filed: Dec. 11, 1973

[21] Appl. No.: 423,788

[30] Foreign Application Priority Data
Dec. 13, 1972 Germany............................ 2260797

[52] U.S. Cl................... 74/230.17 F; 74/230.17 E
[51] Int. Cl.²........................................ F16H 55/52
[58] Field of Search............ 74/230.17 E, 230.17 F, 74/230.17 R, 230.17 A, 336, 336 B, 752 C, 217 R, 217 CV

[56] References Cited
UNITED STATES PATENTS

| | | | |
|---|---|---|---|
| 2,903,083 | 9/1959 | Kelley | 74/336 B |
| 2,911,961 | 11/1959 | McRae | 74/336 |
| 2,962,910 | 12/1960 | Wolfram | 74/336 B |
| 2,964,959 | 12/1960 | Beck et al. | 74/336 B |
| 3,269,207 | 8/1966 | Borsattino | 74/230.17 F |
| 3,478,611 | 11/1969 | Venne et al. | 74/230.17 E |
| 3,715,930 | 2/1973 | Beliveau et al. | 74/230.17 E |

FOREIGN PATENTS OR APPLICATIONS
1,500,486    7/1969    Germany..................... 74/230.17 F

*Primary Examiner*—Samuel Scott
*Assistant Examiner*—Allan R. Burke
*Attorney, Agent, or Firm*—Craig & Antonelli

[57] ABSTRACT

A controllable aggregate-drive for internal combustion engines, especially for motor vehicle internal combustion engines, in which a transmission ratio providing a speed increase is obtained with the aid of an adjustable V-belt transmission at low rotational speeds of the engine and a transmission ratio providing a speed reduction takes place at high rotational speeds of the internal combustion engine; the adjustment thereby takes place at the drive pulley of the V-belt transmission with the aid of an adjusting piston actuated by pressure oil against a spring force whereby the pressure space receiving the adjusting piston is filled with oil having a predetermined constant basic pressure from the lubricating oil circulation of the internal combustion engine by way of a control valve while the adjusting piston is actuated above the basic pressure by the centrifugal force of the oil-filling on the inside of the pressure space.

19 Claims, 2 Drawing Figures

US Patent   Sept. 23, 1975   3,906,808

CONTROLLABLE AGGREGATE-DRIVE FOR INTERNAL COMBUSTION ENGINES, ESPECIALLY FOR MOTOR VEHICLE INTERNAL COMBUSTION ENGINES

The present invention relates to a controllable aggregate-drive for internal combustion engines, especially for motor vehicle internal combustion engines, in such a manner that a transmission ratio with a speed increase takes place from the crankshaft of the engine with the aid of an adjustable V-belt drive at low rotational speeds of the internal combustion engine and a transmission ratio with a speed reduction takes place at high rotational speeds of the internal combustion engine, whereby at the drive pulley of the V-belt transmission the adjustment takes place with the aid of an adjusting piston acted upon by pressure oil with respect to a spring force.

In a prior aggregate-drive of the aforementioned type, the adjusting piston is constructed as ring piston and is acted upon by the centrifugal force which builds up in the cylinder space receiving this ring piston (Offenlegungsschrift 1,576,358). However, this arrangement is not yet quite satisfactory because an oil supply from the outside is necessary. It is furthermore known in the prior art to utilize for the control a separate pressure control system of its own which is fed from a pump rotating with the driving rotational speed (German Pat. No. 1,119,621). This pressure system is disposed outside the V-belt transmission itself and also engages by means of rollers on the movable cone-shaped pulley member from the outside by way of separate plungers. Consequently, this arrangement requires a very large amount of space and also necessitates a complete pressure control system of its own.

The present invention is therefore concerned with the task to avoid the described disadvantages. This means, in other words, an aggregate-drive is to be provided by the present invention which has a simple construction as well as a simple operation and by means of which the desired control characteristics can be achieved accurately and simply. The underlying problems are solved in accordance with the present invention with the aggregate-drives of the aforementioned type in that the pressure space receiving the adjusting piston is filled with oil of a predetermined constant base pressure from the lubricating oil circulatory system of the internal combustion engine by way of a control valve and in that the adjusting piston is acted upon above the base pressure by the centrifugal force pressure of the oil-filling.

A surprisingly simple operation and a surprisingly simple construction of the aggregate-drive can be achieved by the proposal according to the present invention. It is possible to dispense with a completely separate pressure control system and one obtains a feed of the aggregate drive from the inside thereof, so to speak of, out of an already existing oil circulation. The interconnection of the pressure control valve for the base pressure assures a constant starting basis for the centrifugal force pressure so that any pressure fluctuations possibly prevailing in the lubricating oil circulation—which may result from any influences and cannot be controlled without difficulties—cannot influence the control characteristics of the aggregate-drive.

In particular, it is proposed by the present invention that the drive pulley of the V-belt transmission is supported at the block of the internal combustion engine in a bearing bracket and is non-rotatably connected with the crankshaft of the internal combustion engine to rotate in unison therewith, and in that the control valve is arranged in this bearing bracket transversely to the axis of the drive pulley. It is thereby immaterial in principle which pressure-conducting place of the lubricating oil circulation itself is being tapped. It is also feasible within the scope of the present invention to tap the oil bore of a main bearing and to feed the pressure oil to the control valve by way of corresponding housing bores. It is then proposed according to the present invention for the feed to the adjusting piston that the oil controlled to the base pressure is adapted to be fed from the control valve to the cylinder space receiving the adjusting piston by way of an inclined bore leading into the crankshaft and from there by means of a central bore into the fastening bolt for the drive pulley.

In one embodiment according to the present invention, the adjusting piston has approximately the same size as the drive pulley of the V-belt transmission itself. It is thereby additionally proposed according to the present invention that the cylinder space receiving the adjusting piston is in constant communication with the discharge by way of a small throttle bore. A venting can be achieved in this manner insofar as air or gas inclusions have penetrated the lubricating oil in any manner whatsoever.

A further proposal of the present invention resides in that in the control valve, the space receiving the spring is connected with the discharge by way of a small throttle bore. A slight delay is achieved in this manner during response of the adjustment and additionally a damping of oscillatory appearances is attained thereby.

In one embodiment according to the present invention, the adjusting piston is constructed as plate-shaped plunger piston and is equipped with a roller bellows which, with its outer edge, is clamped-in between two housing parts, whose one part forms the cylinder and is connected with the crankshaft and whose other part includes a drum-shaped part for the rolling off action of the roller bellows and additionally forms the axially immovable cone-shaped disk-like pulley member of the driving pulley of the V-belt transmission. It is thereby additionally proposed that the immovable pulley member is connected with a hub portion which is extended sleeve-shaped toward the end opposite the crankshaft and receives thereat the axially displaceable cone-shaped, disklike pulley member which, in its turn, is operatively connected with the adjusting piston by way of several thrust bolts which extend through the fixed pulley member.

The construction may thereby take place in such a manner that the axially displaceable pulley member is supported on an abutment by means of a spring, which abutment is secured at the end of the extension of the sleeve-shaped hub portion. Appropriately, a plate spring or cup spring will be used for that purpose even though other springs could also be used of course. As to the rest, it may be desirable to additionally extend the sleeve-shaped hub portion beyond the abutment and then to suport on that portion, for example, the fan of the internal combustion engine in order that the fan assumes the correct position relative to the radiator and internal combustion engine. The drive of the fan then takes place by way of a V-belt transmission, no longer adjustable, between the driven pulley of the adjustable V-belt transmission and a V-belt pulley supported on the aforementioned extension.

Accordingly, it is an object of the present invention to provide a controllable aggregate-drive for internal combustion engines, especially for motor vehicle internal combustion engines, which avoids by simple means the aforementioned shortcomings and drawbacks encountered in the prior art.

Another object of the present invention resides in a controllable aggregate-drive for internal combustion engines which is simple in construction yet is highly reliable in operation.

A further object of the present invention resides in a controllable aggregate-drive for internal combustion engines, especially for motor vehicle internal combustion engines which obviates the need for an external oil supply and eliminates the requirement for a large amount of space as well as a complete pressure control system of its own.

Still a further object of the present invention resides in a controllable aggregate-drive, by means of which the desired control characteristics can be achieved accurately and surprisingly simply.

Another object of the present invention resides in a controllable aggregate-drive of the type described above in which the control characteristics of the aggregate-drive cannot be influenced by fluctuations in the pressure of the pressure medium used for controlling the aggregate-drive.

A further object of the present invention resides in a controllable aggregate-drive which permits venting of the hydraulic medium in the event air or gas inclusions have entered the hydraulic medium.

Still another object of the present invention resides in a controllable aggregate-drive in which a damping of oscillatory appearances is ensured.

Figure 2:
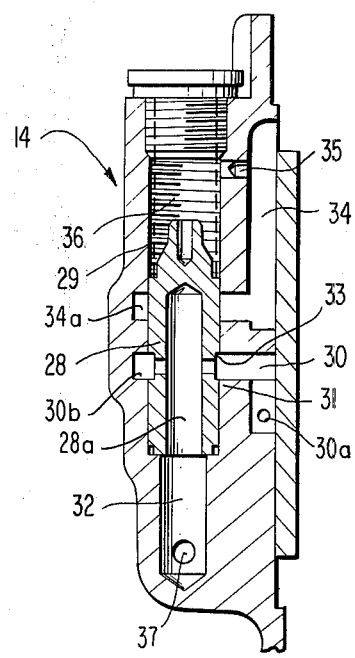

These and further objects, features and advantages of the present invention will become more apparent from the following description when taken in connection with the accompanying drawing which shows, for purposes of illustration only, one embodiment in accordance with the present invention, and wherein:

FIG. 1 is an axial longitudinal cross-sectional view through the drive pulley of a controllable V-belt transmission in accordance with the present invention; and FIG. 2 is a partial cross-sectional view through the control valve of the present invention.

Referring now to the drawing wherein like reference numerals are used throughout the various views to designate like parts, and more particularly to FIG. 1, the drive pulley generally designated by reference numeral 10 of the controllable V-belt transmission is mounted in this figure with a hub portion 11 thereof on the crankshaft 12 and is non-rotatably connected with the latter so as to rotate in unison therewith. A bearing bracket 13 accommodates the control valve generally designated by reference numeral 14 which is illustrated in detail in FIG. 2 and will be further described hereinafter. In the drive pulley 10, a cylinder space 17 is formed by the housing parts 15 and 16, in which is arranged a plate-shaped plunger piston 18. The plunger piston 18 carries a roller bellows 19 which ia clamped-in at its outer circumference between the two housing parts 15 and 16. The housing part 16 forms, at the same time, the axially immovable cone-shaped disk-like pulley member 20.

A hub portion 21 is secured internally at this pulley member 20, which is provided with a forwardly pointing extension 22. The axially movable cone-shaped pulley member 24 is supported on this extension 22 by means of a sliding bush or sleeve 23. The axially movable pulley member 24 is prestressed in the direction toward the immovable pulley member 20 by means of a cup spring 25. The cup spring 25, in its turn, is supported at an abutment 26 which is secured at the end of the extension 22. Several thrust bolts 27 uniformly distributed over the circumference are provided at the plunger piston 18 which extend through the axially immovable pulley member 20 and which are connected with the movable pulley member 24 and with the sliding sleeve 23. In this manner, the plunger piston 18 is able to displace the movable pulley member 24 toward the left as viewed in FIG. 1 against the spring 25 with a corresponding pressure actuation thereof. According to FIG. 2, the control valve 14 is constituted by a control piston 28 having a longitudinal bore 28a and control edges 31 and 33 which cooperate with bore 30 and annular discharge groove 34a, respectively. As apparent from FIG. 2, the piston 28, on the one hand, is acted upon by the spring 29 and, on the other, by the pressure in the lubricating oil circulation system. The pressure oil from the lubricating oil circulation system enters the control valve 14 through a transverse bore 30a and then the oil flows through bore 30, annular groove 30b, and longitudinal bore 28a to the space 32. By virtue of the pressure oil entering the space 32, the control piston 28 is urged against the bias of the spring 29 causing the piston 28 to be displaced until a constant base pressure is achieved which corresponds to the force of the spring 29. The cooperation between the control edge 31 and the bore 30 and the control edge 33 and the annular discharge groove 34a assures the maintenance of the state of equilibrium between the oil pressure in the space 32 and the force of the spring 29. To obtain a slight delay during the response of the adjustment of the piston 18 and also the damping of the oscillatory appearances, the space 36 receiving the spring 29 is connected with the discharge 34 by way of a small throttle bore 35.

From the space 32, the base pressure reaches the central dead-end bore 39 of the crankshaft 12 by way of the inclined bores 37 and 38. From there, the oil having the base pressure enters the cylinder space 17 by way of the central bore 40 and is able to actuate thereat the adjusting piston 18. A small throttle bore 41 is provided in the hub portion 11 which leads back into the sump (not shown) by way of the further bores 42 and 43. A venting of the cylinder space 17 is assured in this manner in case that the lubricating oil reaches the cylinder space in a slightly foamed-up condition.

At low rotational speeds of the internal combustion engine, the drive pulley 10 is in the position illustrated in the upper half of FIG. 1. The cylinder space 17 is thereby filled with a constant base pressure by way of the control valve 14. If now the rotational speeds of the crankshaft 12 and therewith of the drive pulley increases, then also the centrifugal force in the cylinder space 17 increases and thereby displaces the adjusting piston 18 and therewith the displaceable pulley member 24 toward the left opposite the force of the cup spring 25. As a result thereof, the transmission ratio is controlled to provide a speed reduction. The inflowing oil is always held at the constant base pressure by the control valve 14 so that exclusively the centrifugal force acts as control magnitude. With a decreasing rotational speed of the internal combustion engine, the operation takes place in a reverse manner.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A controllable aggregate-drive for internal combustion engines which includes an adjustable V-belt transmission means adapted to be operatively connected with a crankshaft of the engine and operable to provide a transmission ratio with a speed increase at low rotational speeds of the internal combustion engine and a transmission ratio with a speed reduction at high rotational speeds of the internal combustion engine, said V-belt transmission means including a drive pulley means adjustable with the aid of an adjusting piston means actuated by pressure oil against a spring force, characterized by cylinder space means forming a pressure space means and receiving the adjusting piston means, the pressure space means is filled with oil having a predetermined substantially constant base pressure from the lubricating oil circulation of the internal combustion engine by way of a control valve means and in that above the base pressure the adjusting piston means is acted upon by the centrifugal force of the oil-filling within said pressure space means.

2. An aggregate-drive according to claim 1, characterized in that above said base pressure the adjusting piston means is actuated substantially exclusively by said centrifugal force.

3. An aggregate-drive according to claim 1, characterized in that the drive pulley means is supported at the engine block in a bracket means and is non-rotatably connected with the engine crankshaft while the control valve means is arranged in said bracket means substantially transversely to the axis of the drive pulley means.

4. An aggregate-drive according to claim 3, characterized in that the oil adjusted to the base pressure is adapted to be fed from the control valve means to the cylinder space means receiving the adjusting piston means by way of inclined bore means leading into the crankshaft and from there by means of a central bore into a fastening bolt for the drive pulley means.

5. An aggregate-drive according to claim 4, characterized in that the adjusting piston means has about the same size as the drive pulley means.

6. An aggregate-drive according to claim 5, characterized in that the cylinder space means receiving the adjusting piston means is in constant communication with the discharge by way of a small throttle.

7. An aggregate-drive according to claim 6, characterized in that the control valve means includes a space receiving a spring which is connected with the discharge by way of a small throttle bore.

8. An aggregate-drive according to claim 7, characterized in that the adjusting piston means is constructed as plate-shaped plunger piston and is provided with a roller bellows which at its outer edge is clamped between two housing parts, one of said housing parts forming the cylinder space means and being connected with the crankshaft and the other housing part having a drum portion for the rolling-off action of the roller bellows and additionally forming an axially immovable pulley member of the drive pulley means.

9. An aggregate-drive according to claim 8, characterized in that the immovable pulley member is connected with a hub portion which is extended sleeve-shaped toward the end opposite the crankshaft and receives thereat the axially movable pulley member which in its turn is operatively connected with the adjusting piston means by thrust bolt means extending through the fixed pulley member.

10. An aggregate-drive according to claim 9, characterized in that the axially immovable pulley member is supported at an abutment by means of a spring, said abutment being secured at the end of the extension of the sleeve-shaped hub portion.

11. An aggregate-drive according to claim 10, characterized in that said spring is a cup spring.

12. An aggregate-drive according to claim 1, characterized in that the oil adjusted to the base pressure is adapted to be fed from the control valve means to the cylinder space means receiving the adjusting piston means by way of inclined bore means leading into the crankshaft and from there by means of a central bore into a fastening bolt for the drive pulley means.

13. An aggregate-drive according to claim 1, characterized in that the adjusting piston means has about the same size as the drive pulley means.

14. An aggregate-drive according to claim 1, characterized in that the cylinder space means receiving the adjusting piston means is in constant communication with the discharge by way of a small throttle.

15. An aggregate-drive according to claim 1, characterized in that the control valve means includes a space receiving a spring which is connected with the discharge by way of a small throttle bore.

16. An aggregate-drive according to claim 1, characterized in that the adjusting piston means is constructed as plate-shaped plunger piston and is provided with a roller bellows which at its outer edge is clamped between two housing parts, one of said housing parts forming the cylinder space means and being connected with the crankshaft and the other housing part having a drum portion for the rolling-off action of the roller bellows and additionally forming an axially immovable pulley member of the drive pulley means.

17. An aggregate-drive with an axially immovable pulley member and an axially movable pulley member according to claim 1, characterized in that the immovable pulley member is connected with a hub portion which is extended sleeve-shaped toward the end opposite the crankshaft and receives thereat the axially movable pulley member which in its turn is operatively connected with the adjusting piston means by thrust bolt means extending through the fixed pulley member.

18. An aggregate-drive according to claim 17, characterized in that the axially immovable pulley member is supported at an abutment by means of a spring, said abutment being secured at the end of the extension of the sleeve-shaped hub portion.

19. An aggregate-drive according to claim 18, characterized in that said spring is a cup spring.

* * * * *